United States Patent
Sugino et al.

(10) Patent No.: US 11,313,181 B2
(45) Date of Patent: Apr. 26, 2022

(54) THREADED CONNECTION FOR STEEL PIPE

(71) Applicants: Nippon Steel Corporation, Tokyo (JP); Vallourec Oil and Gas France, Aulnoye-Aymeries (FR)

(72) Inventors: Masaaki Sugino, Tokyo (JP); Yousuke Oku, Tokyo (JP); Keita Inose, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 81 days.

(21) Appl. No.: 16/627,850

(22) PCT Filed: Oct. 2, 2018

(86) PCT No.: PCT/JP2018/036859
§ 371 (c)(1),
(2) Date: Dec. 31, 2019

(87) PCT Pub. No.: WO2019/082612
PCT Pub. Date: May 2, 2019

(65) Prior Publication Data
US 2020/0248509 A1 Aug. 6, 2020

(30) Foreign Application Priority Data
Oct. 25, 2017 (JP) .............................. JP2017-206157

(51) Int. Cl.
*E21B 17/042* (2006.01)
*F16L 15/04* (2006.01)

(52) U.S. Cl.
CPC ............ *E21B 17/042* (2013.01); *F16L 15/04* (2013.01)

(58) Field of Classification Search
CPC ....... F16L 15/004; F16L 15/009; F16L 15/04; E21B 17/042
See application file for complete search history.

(56) References Cited

U.S. PATENT DOCUMENTS

2015/0001841 A1* 1/2015 Oshima ................. F16L 15/004
285/94
2016/0319966 A1* 11/2016 Kawai ..................... F16L 15/04
(Continued)

FOREIGN PATENT DOCUMENTS

| JP | 2005511990 A | 4/2005 |
| JP | 2006-526747 A | 11/2006 |

(Continued)

OTHER PUBLICATIONS

English Abstract & Family List of JP2005511990A.
(Continued)

*Primary Examiner* — David Bochna
(74) *Attorney, Agent, or Firm* — Banner & Witcoff, Ltd.

(57) ABSTRACT

A threaded connection for steel pipe is provided that improves its internal-pressure sealability while maintaining the high external-pressure sealability of a threaded connection having a nose used in a steel pipe with large diameter and large wall thickness. In a threaded connection for connecting steel pipe bodies each having an outer diameter equal to or larger than 7 inches and a wall thickness equal to or larger than 0.7 inches, Expression (1) in the description is satisfied and $t_B/t_L > 1.4$, where $\delta$ [mm] is the clearance between the outer surface of the pin and the inner surface of the box upon make-up as measured at the borderline between the pin taper surface and the pin round surface, D [inch] is the outer diameter of the steel pipe body, t [inch] is the wall thickness of the steel pipe body, L [mm] is the distance between a pivot point, which is a position, in the region of contact between the pin sealing surface and the box (Continued)

sealing surface, which is closest to the tip of the pin, and the tip of the pin upon make-up as measured along the pipe-axis direction, $t_L$ [mm] is the wall thickness of the pin as measured at the pivot point, and $t_B$ [mm] is the wall thickness of the box as measured at the pivot point.

5 Claims, 5 Drawing Sheets

(56) References Cited

U.S. PATENT DOCUMENTS

| | | | |
|---|---|---|---|
| 2019/0383106 A1* | 12/2019 | Inose | E21B 17/042 |
| 2020/0278056 A1* | 9/2020 | Oku | E21B 17/042 |

FOREIGN PATENT DOCUMENTS

| | | |
|---|---|---|
| JP | 4535064 B2 | 9/2010 |
| JP | 2014535023 A | 12/2014 |
| JP | 2015132285 A | 7/2015 |
| WO | 2005121622 A1 | 12/2005 |
| WO | 2009044851 A1 | 4/2009 |
| WO | 2017141538 A1 | 8/2017 |

OTHER PUBLICATIONS

English Abstract & Family List of JP4535064B2.
English Abstract & Family List of JP2006526747A.
English Abstract & Family List of JP2015132285A.
English Abstract & Family List of WO2017141538A1.
English Abstract & Family List of WO2005121622A1.
English Abstract & Family List of WO2009044851A1.
English Abstract & Family List o JP2014535023A.

* cited by examiner

THREADED CONNECTION FOR STEEL PIPE

RELATED APPLICATION DATA

This application is a National Stage Application under 35 U.S.C. 371 of PCT application number PCT/JP2018/036859 designating the United States and filed Oct. 2, 2018; which claims the benefit of JP application number 2017-206157 and filed Oct. 25, 2017 each of which are hereby incorporated by reference in their entireties.

TECHNICAL FIELD

The present disclosure relates to a threaded connection for steel pipe, and more particularly to a threaded connection for connecting steel pipes with large diameters and large wall thicknesses.

BACKGROUND ART

Steel pipes called oil-well pipes are used, for example, for prospecting or producing oil or natural gas in oil wells or natural-gas wells (hereinafter collectively referred to as "oil wells" or the like), developing non-conventional resources such as oil sand or shale gas, retrieving or storing carbon dioxide (Carbon dioxide Capture and Storage (CCS)), geothermal power generation, or in hot springs. A threaded connection is used to connect steel pipes.

Such threaded connections for steel pipes are generally categorized as coupling type and integral type. A coupling-type connection connects a pair of pipes, one of which is a steel pipe and the other one is a short pipe called coupling. In this case, a male thread is provided on the outer periphery of each of the ends of the steel pipe, while a female thread is provided on the inner periphery of each of the ends of the coupling. Then, a male thread of the steel pipe is screwed into a female thread of the coupling such that they are made up and connected. An integral-type connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed into the female thread of the other steel pipe such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". A pin and a box constitute ends of pipes and are thus tubular in shape.

An oil well is drilled along while its side wall is reinforced by oil-well pipes to prevent the side wall from collapsing during digging, which results in multiple oil-well pipes arranged in one another. In recent years, both on-land and offshore wells have become deeper and deeper; in such environments, to connect oil-well pipes, threaded connections in which the inner and outer diameters of the connection portions are generally equal to the inner and outer diameters of the steel pipes are often used in order to improve efficiency in developing oil wells. The use of such threaded connections minimizes the annular gaps between the multiple oil-well pipes arranged in one another, which improves efficiency in developing a deep oil well without significantly increasing the diameter of the well. A threaded connection is required to have good sealability against pressure fluid from the inside (hereinafter also referred to as "internal pressure") and pressure fluid from the outside (hereinafter also referred to as "external pressure") under the above-described restrictions on the inner and outer diameters. Generally, the sealability against the internal pressure is called "internal-pressure sealability", while the sealability against the external pressure is called "external-pressure sealability".

Known threaded connections that ensure sealability include those having a seal that uses metal-to-metal contact (hereinafter referred to as "metal seal"). A metal seal is an arrangement in which the diameter of a pin sealing surface is slightly larger than the diameter of a box sealing surface (the difference between these diameters will be referred to as "amount of interference") and, when the threaded connection is made up and the sealing surfaces are fitted onto each other, the amount of interference causes the diameter of the pin sealing surface to decrease and the diameter of the box sealing surface to increase and each of the sealing surfaces tries to recover their original diameters and thus generates elastic recovery forces, which produce contact pressures on the sealing surfaces to cause them to adhere to each other along the entire periphery, thereby providing sealability.

JP 2006-526747 A (Patent Document 1) discloses a technique used for a threaded connection for steel pipe including a pin and a box, where a nose is provided on the pin to improve the external-pressure sealability while maintaining its internal-pressure sealability.

JP 2015-132285 A (Patent Document 2) discloses a technique used for a threaded connection for steel pipe including a pin and a box, where galling is to be prevented while ensuring internal-pressure and external-pressure sealability.

Japanese Patent No. 4535064 (Patent Document 3) teaches that a threaded connection including one metal seal and one nose has a higher external-pressure sealability than a threaded connection without a nose.

The following prior art documents are incorporated herein by reference.

[Patent Document 1] JP 2006-526747 A
[Patent Document 2] JP 2015-132285 A
[Patent Document 3] Japanese Patent No. 4535064

SUMMARY OF THE INVENTION

An object of the present disclosure is to provide a threaded connection that improves its internal-pressure sealability while maintaining the high external-pressure sealability of a threaded connection having a nose used in a steel pipe with large diameter and large wall thickness.

A threaded connection for steel pipe according to the present disclosure is a threaded connection for connecting steel pipe bodies each having an outer diameter equal to or larger than 7 inches and a wall thickness equal to or larger than 0.7 inches. The threaded connection includes a tubular pin and a tubular box. The box is made up on the pin as the pin is inserted therein. The pin includes a nose, a pin shoulder surface, a pin taper surface, a pin round surface, a male thread, and a pin sealing surface. The nose is provided on a tip portion of the pin and has an outer diameter smaller than an inner diameter of a portion of the box that faces tip portion of the pin when the connection has been made up. The pin shoulder surface is provided on a tip of the nose. The pin taper surface is provided on an outer periphery of the nose. The pin round surface is provided on an edge between the pin shoulder surface and the pin taper surface. The male thread is provided on an outer periphery of the pin. The pin sealing surface is provided on the outer periphery of the pin and located between the nose and the male thread. The box includes a box shoulder surface, a female thread, and a box sealing surface. The box shoulder surface faces the pin shoulder surface and is in contact with the pin shoulder surface when the connection has been made up. The female thread corresponds to the male thread and provided on an inner periphery of the box. The box sealing surface faces the pin sealing surface and is in contact with the pin sealing surface upon make-up.

Expression (1) provided below is satisfied and $t_B/t_L > 1.4$, where δ [mm] is the clearance between the outer surface of the pin and the inner surface of the box upon make-up as measured at the borderline between the pin taper surface and the pin round surface, D [mm] is the outer diameter of the steel pipe body, t [mm] is the wall thickness of the steel pipe body, L [mm] is the distance between a pivot point, which is a position, in the region of contact between a pin sealing surface and the box sealing surface, which is closest to the tip of the pin, and the tip of the pin upon make-up as measured along the pipe-axis direction, $t_L$ [mm] is the wall thickness of the pin as measured at the pivot point, and $t_B$ [mm] is the wall thickness of the box as measured at the pivot point.

$$0.30 + \min(a_n t_L + b_n D, n=1,2,3) > \delta > \min(a_n t_L + b_n D, n=1,2,3) \quad (1).$$

Here, min is a function that takes the minimum of the three factors in its parentheses, $a1 = (L/t) \times 0.0115 \times (t_L/t)^{-1.68778} - 0.00247 \times (t_L/t)^{-2.02052}$;
$b1 = (L/t) \times 0.0076 \times (t_L/t)^{-0.65672} - 0.00120 \times (t_L/t)^{-1.06817}$;
$a2 = (L/t) \times 0.00725 \times (t_L/t)^{-1.67341} - 0.00157 \times (t_L/t)^{-1.93212}$;
$b2 = 0$;
$a3 = -(L/t) \times 0.00256 \times (t_L/t)^{-2.40620} + 0.00372 \times (t_L/t)^{-2.19899}$; and
$b3 = (L/t) \times 0.01986 \times (t_L/t)^{-0.88615} - 0.01048 \times (t_L/t)^{-1.00532}$.

EMBODIMENTS FOR CARRYING OUT THE INVENTION

[External-Pressure Sealability]

Figure 1:
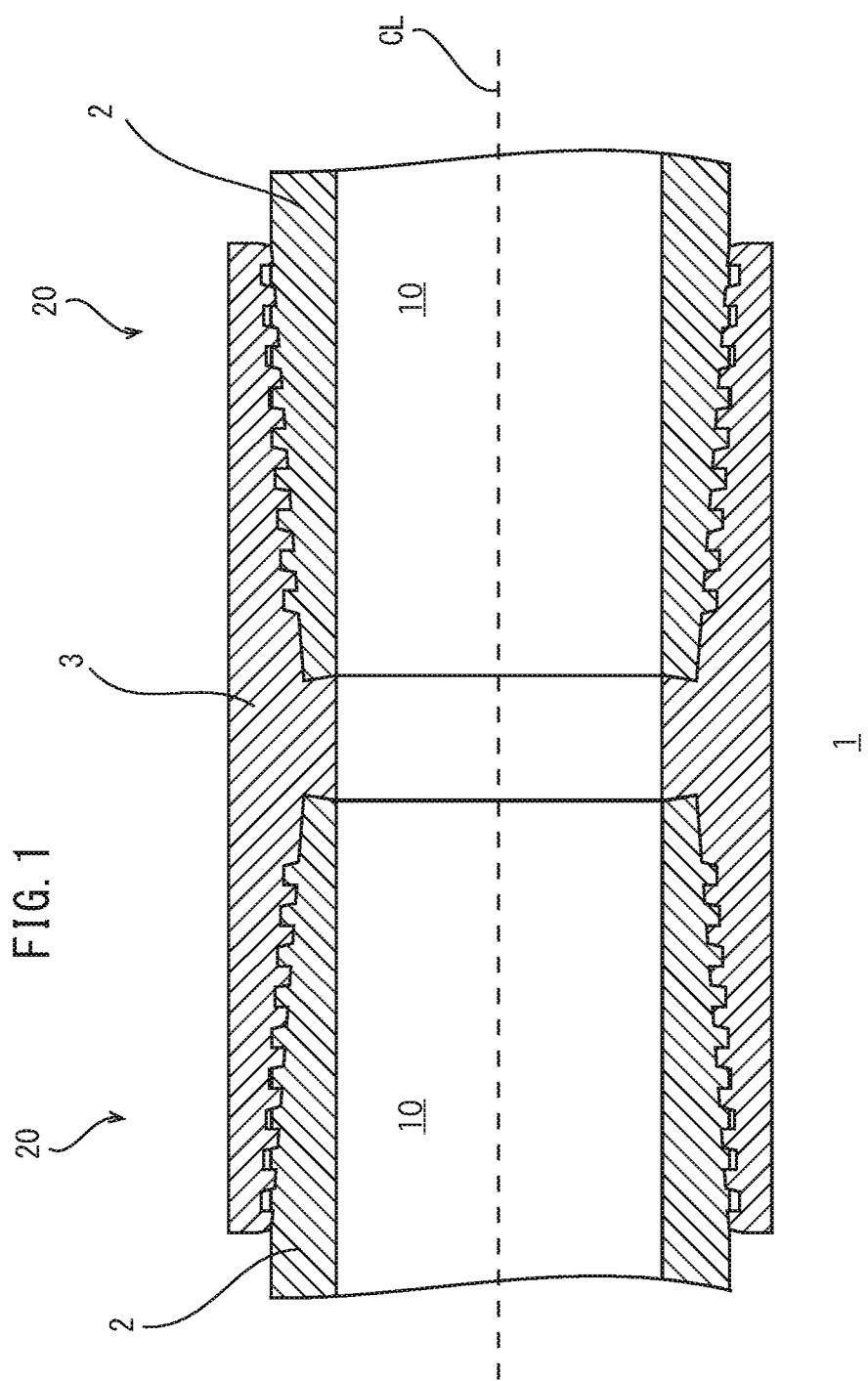
FIG. 1 is a schematic longitudinal cross-sectional view of a coupling-type threaded connection according to an embodiment.

In a threaded connection for steel pipe with a large wall thickness, the external-pressure values in accordance with the API 5C3 standard are close to the 100% VME external-pressure values (i.e. the yield load values of the material itself without no added collapse strengths). If such a very high external pressure is applied, an external-pressure leak may occur even in a threaded connection for steel pipe with a large wall thickness.

The present inventors did extensive research and identified the causes of external-pressure leaks. That is, a high external pressure that has penetrated onto the threads reduces the diameter of all the portions of the pin that are located rearward of the metal seal, while no external pressure penetrates onto the portions located forward of the metal seal and thus their diameter does not decrease, and, as a result, the portions of the pin located closer to the tip than the male thread, including the metal seal and nose (hereinafter referred to as "pin lip"), are warped radially outwardly. Thus, the seal point moves toward the tip of the pin from out of the seal-suited surface (i.e. surface that has been treated to provide a suitable surface roughness or subjected to other suitable surface treatment to enable formation of a metal seal, and has been made fit by appropriate sliding during make-up of the connection), or the pin lip strongly contacts the inner periphery of the box such that seal contact forces significantly decrease, thus significantly reducing the external-pressure sealability.

Based on these new findings, the present inventors assumed that the external-pressure sealability even in a threaded connection for steel pipe with a large wall thickness can be prevented from significantly decreasing if a lower limit is set on the clearance δ to prevent the tip of the nose from strongly contacting the inner periphery of the box even when a high external pressure is applied. Then, they adopted the elastic cylindrical shell theory to estimate the amount of warp deformation of the nose (which is a half of the amount of diameter increase) found when an external pressure is applied, and identified the appropriate lower limit for the clearance δ.

[Internal-Pressure Sealability]

When an internal pressure is applied, the diameter of the pin lip increases to amplify seal contact forces. However, in a steel pipe with a large diameter and a large wall thickness, if the wall thickness of the box is small relative to the pin, the amount of increase in the diameter of the box resulting from an application of an internal pressure is also large, reducing the amplification of seal contact forces. In view of this, the present inventors assumed that there should be a suitable value of the ratio of the seal wall thickness of the pin and that of the box to increase the amplification of seal contact forces to improve the internal-pressure sealability.

Based on these findings, the present inventors invented a threaded connection for steel pipe that improves the internal-pressure sealability while maintaining the high external-pressure sealability of a threaded connection with a nose used in a steel pipe with a large diameter and a large wall thickness.

A threaded connection for steel pipe according to an embodiment is a threaded connection for connecting steel pipe bodies each having an outer diameter equal to or larger than 7 inches and a wall thickness equal to or larger than 0.7 inches. The threaded connection includes a tubular pin and a tubular box. The box is made up on the pin as the pin is inserted therein. The pin includes a nose, a pin shoulder surface, a pin taper surface, a pin round surface, a male thread, and a pin sealing surface. The nose is provided on a tip portion of the pin and has an outer diameter smaller than an inner diameter of a portion of the box that faces the tip portion of the pin when the connection has been made up. The pin shoulder surface is provided on a tip of the nose. The pin taper surface is provided on an outer periphery of the nose. The pin round surface is provided on an edge between the pin shoulder surface and the pin taper surface. The male thread is provided on an outer periphery of the pin. The pin sealing surface is provided on the outer periphery of the pin and located between the nose and the male thread. The box includes a box shoulder surface, a female thread, and a box sealing surface. The box shoulder surface faces the pin shoulder surface and is in contact with the pin shoulder surface when the connection has been made up. The female thread corresponds to the male thread and provided on an inner periphery of the box. The box sealing surface faces the pin sealing surface and is in contact with the pin sealing surface upon make-up.

Expression (1) provided below is satisfied and $t_B/t_L>1.4$, where $\delta$ [mm] is the clearance between the outer surface of the pin and the inner surface of the box upon make-up as measured at the borderline between the pin taper surface and the pin round surface, D [mm] is the outer diameter of the steel pipe body, t [mm] is the wall thickness of the steel pipe body, L [mm] is the distance between a pivot point, which is a position, in the region of contact between the pin sealing surface and the box sealing surface, which is closest to the tip of the pin, and the tip of the pin upon make-up as measured along the pipe-axis direction, $t_L$ [mm] is the wall thickness of the pin as measured at the pivot point, and $t_B$ [mm] is the wall thickness of the box as measured at the pivot point.

$$0.30 + \min(a_n t_L + b_n D, n=1,2,3) > \delta > \min(a_n t_L + b_n D, n=1,2,3) \quad (1).$$

Here, min is a function that takes the minimum of the three factors in its parentheses. a1, a2, a3, b1, b2 and b3 are defined as follows:

a1=(L/t)×0.0115×$(t_L/t)^{-1.68778}$−0.00247×$(t_L/t)^{-2.02052}$;
b1=(L/t)×0.0076×$(t_L/t)^{-0.65672}$−0.00120×$(t_L/t)^{-1.06817}$;
a2=(L/t)×0.00725×$(t_L/t)^{-1.67341}$−0.00157×$(t_L/t)^{-1.93212}$;
b2=0;
a3=−(L/t)×0.00256×$(t_L/t)^{-2.40620}$+0.00372×$(t_L/t)^{-2.19899}$; and
b3=(L/t)×0.01986×$(t_L/t)^{-0.88615}$−0.01048×$(t_L/t)^{-1.00532}$.

In the threaded connection for steel pipe according to the embodiment, such a lower limit on the clearance $\delta$ is set that, even when a high external pressure that has penetrated onto the threads reduces the diameter of all the portions of the pin located rearward of the pin sealing surface and, in a reaction thereto, the nose is warped with respect to the pivot point, the external-pressure sealability derived from the nose can be maintained. The upper limit of the clearance $\delta$ is the lower limit of clearance plus 0.3 mm to prevent the amount of cut or the number of passes during machining from increasing unnecessarily.

On the other hand, since a lower limit on the wall-thickness ratio $t_B/t_L$, 1.4, is set, the increase of the diameter of the box derived from an application of an internal pressure can be minimized even in a steel pipe with a large diameter and a large wall thickness. This increases the amplification of seal contact forces, thereby improving the internal-pressure sealability.

Thus, the threaded connection according to the present embodiment improves the internal-pressure sealability while maintaining the high external-pressure sealability of a threaded connection with a nose used in a steel pipe with a large diameter and a wall thickness.

Preferably, $t_B/t_L>2.0$, and more preferably $t_B/t_L>2.2$.

The threaded connection may be integral-type or coupling-type.

The nose may have a 0.2% offset yield strength 1.05 or more times the 0.2% offset yield strength of the steel pipe body, prior to make-up and as measured in the circumferential direction.

Specific methods for increasing the 0.2% offset yield strength include performing cold reduction on a pipe end before threading or performing quench strengthening through high-frequency heating, for example.

At least one of chemical conversion treatment, sand blasting and metal plating may be applied to at least one of the male thread and the female thread, at least one of the pin sealing surface and the box sealing surface, and at least one of the pin shoulder surface and the box shoulder surface.

EMBODIMENTS

Embodiments of the threaded connection for steel pipe will now be described with reference to the drawings. The same and corresponding components in the drawings are labeled with the same reference characters and their description will not be repeated.

FIG. 1 is a schematic longitudinal cross-sectional view of a threaded connection 1 for steel pipe according to an embodiment. As shown in FIG. 1, the threaded connection 1 is a threaded connection for connecting steel pipe bodies 2. The threaded connection 1 includes tubular pins 10 and a tubular box 20. The box 20 is made up on the pins 10 as the pins 10 are inserted therein. The steel pipe body 2 of each pin 10 is the portion of the steel pipe including the pin 10 which is not located inside the box 20 upon insertion. The steel pipe body 2 has an outer diameter of 7 inches or more and a wall thickness of 0.7 inches or more. That is, the threaded connection 1 is used for steel pipes with relatively large diameters and with relatively large wall thicknesses.

The threaded connection 1 shown in FIG. 1 is a coupling-type one, and includes a coupling 3. The coupling 3 connects two steel pipes. The coupling 3 includes two boxes 20.

Figure 2:
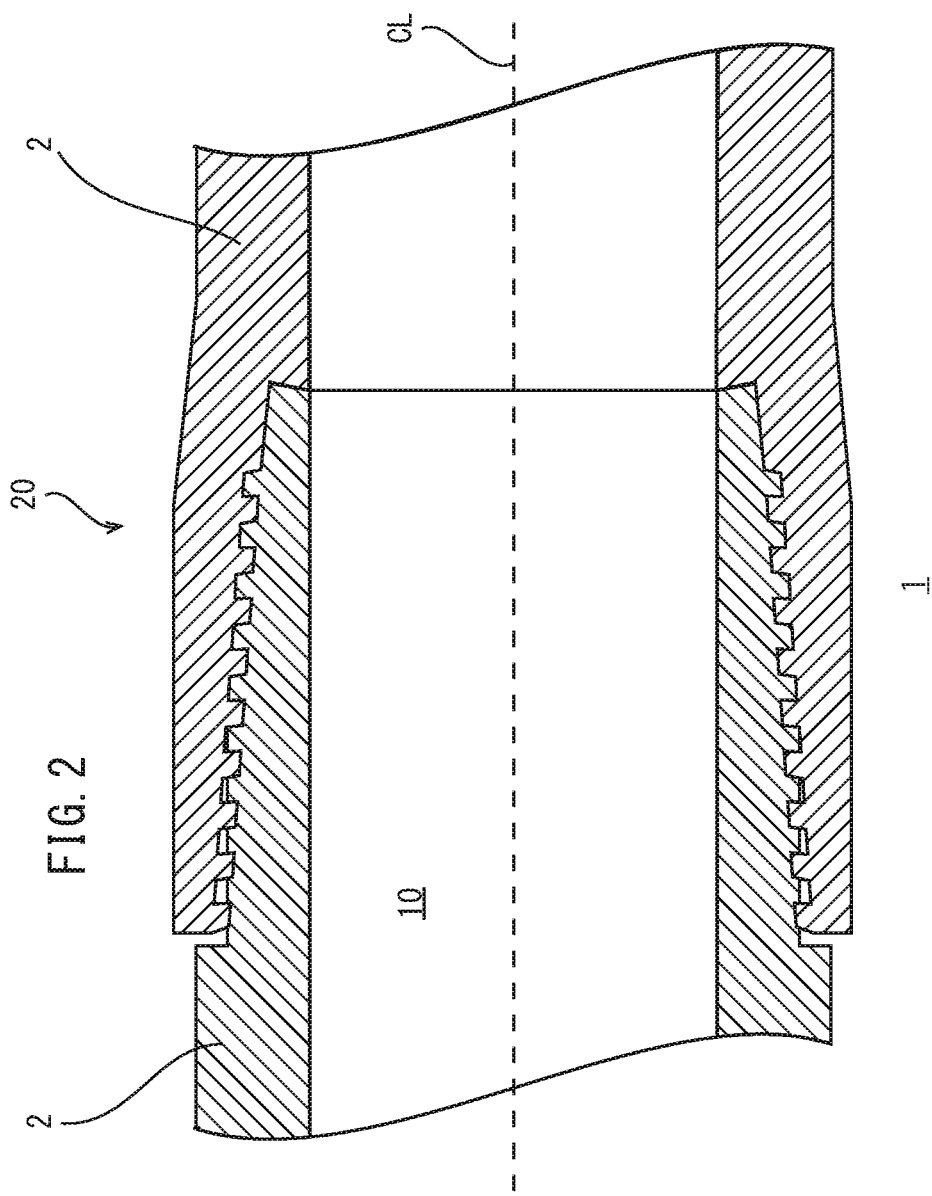
FIG. 2 is a schematic longitudinal cross-sectional view of an integral-type threaded connection, which is different from the connection of FIG. 1.

Alternatively, the threaded connection 1 may be an integral-type one. As shown in FIG. 2, the integral-type threaded connection 1 is also a threaded connection for connecting steel pipe bodies 2, and includes a pin 10 and a box 20. In the integral-type threaded connection 1, one steel pipe includes the pin 10, while the other steel pipe includes the box 20.

Figure 3:
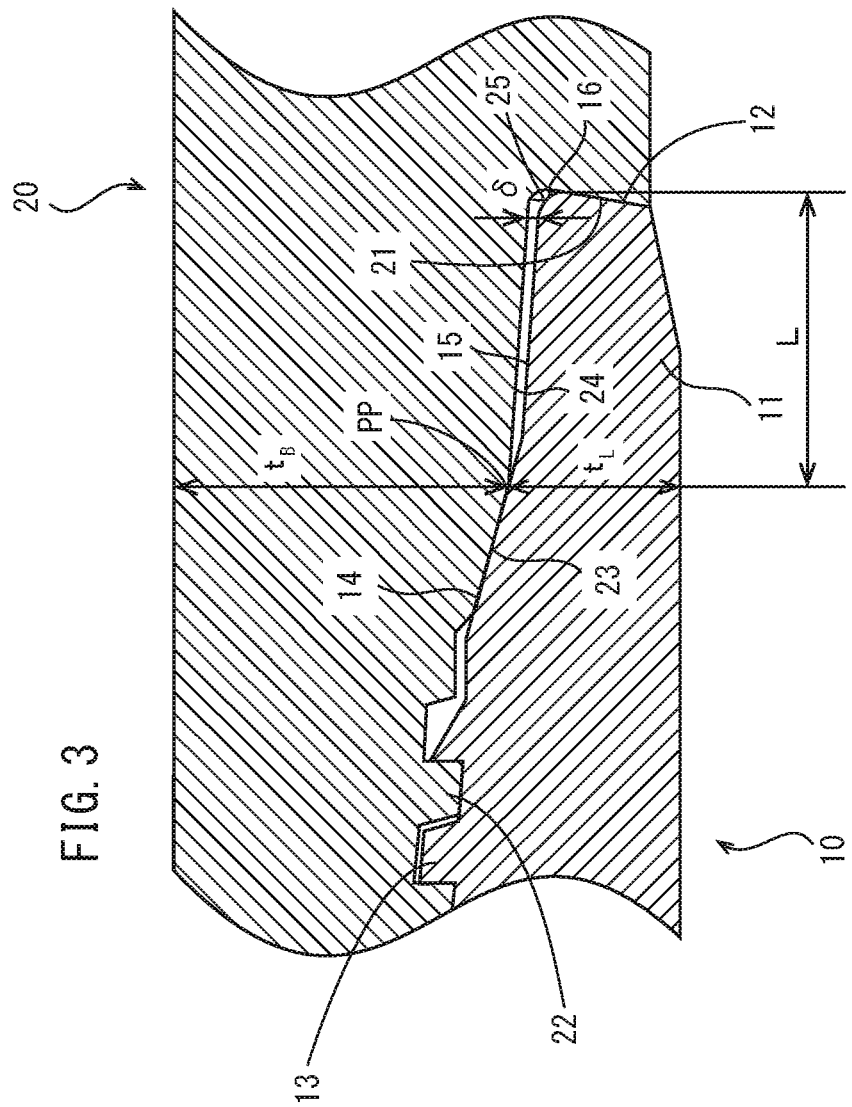
FIG. 3 is a longitudinal cross-sectional view of any of the threaded connections of FIGS. 1 and 2 taken along the pipe-axis direction, showing the nose and nearby portions.

As shown in FIG. 3, the pin 10 includes a nose 11, a pin shoulder surface 12, a pin taper surface 15, a pin round surface 16, a male thread 13, and a pin sealing surface 14. The nose 11 is provided on a tip portion of the pin 10, and has an outer diameter smaller than the inner diameter of the portion of the box 20 that faces the tip portion of the pin 10 when the connection has been made up. The pin shoulder surface 12 is provided on the tip of the nose 11. The pin taper surface 15 is provided on the outer periphery of the nose 11. The pin round surface 16 is provided on the edge between the pin shoulder surface 12 and pin taper surface 15. The male thread 13 is provided on the outer periphery of the pin 10. The pin sealing surface 14 is provided on the outer periphery of the pin 10 and located between the nose 11 and male thread 13.

The box 20 includes a box shoulder surface 21, a female thread 22, a box sealing surface 23, a box taper surface 24, and a box round surface 25. The box shoulder surface 21 faces the pin shoulder surface 12 and is in contact with the pin shoulder surface 12 when the connection has been made up. The female thread 22 corresponds to the male thread 13 and is provided on the inner periphery of the box 20. The box sealing surface 23 faces the pin sealing surface 14 and is contact with the pin sealing surface 14 upon make-up. The box taper surface 24 faces the pin taper surface 15. The box round surface 25 faces the pin round surface 16.

If the clearance between the outer surface of the pin 10 and the inner surface of the box 20 upon make-up as measured at the borderline between the pin taper surface 15 and the pin round surface 16 is denoted by δ [mm], the outer diameter of the steel pipe body 2 is denoted by D [mm], the wall thickness of the steel pipe body 2 is denoted by t [mm], the distance between the pivot point PP and the tip of the pin 10 upon make-up as measured along the pipe-axis direction CL is denoted by L [mm], the wall thickness of the pin 10 as measured at the pivot point PP, which is a position, in the region of contact between the pin sealing surface 14 and the box sealing surface 23, which is closest to the tip of the pin 10, is denoted by $t_L$ [mm], and the wall thickness of the box as measured at the pivot point PP is denoted by $t_B$ [mm], then, Expression (1) provided below is satisfied and $t_B/t_L > 1.4$.

$$0.30 + \min(a_n t_L + b_n D, n=1,2,3) > \delta > \min(a_n t_L + b_n D, n=1,2,3) \quad (1).$$

Here, min is a function that takes the minimum of the three factors in its parentheses.

a1, a2, a3, b1, b2 and b3 are defined as follows:

$a1 = (L/t) \times 0.0115 \times (t_L/t)^{-1.68778} - 0.00247 \times (t_L/t)^{-2.02052}$;
$b1 = (L/t) \times 0.0076 \times (t_L/t)^{-0.65672} - 0.00120 \times (t_L/t)^{-1.06817}$;
$a2 = (L/t) \times 0.00725 \times (t_L/t)^{-1.67341} - 0.00157 \times (t_L/t)^{-1.93212}$;
$b2 = 0$;
$a3 = -(L/t) \times 0.00256 \times (t_L/t)^{-2.40620} + 0.00372 \times (t_L/t)^{-2.19899}$; and
$b3 = (L/t) \times 0.01986 \times (t_L/t)^{-0.88615} - 0.01048 \times (t_L/t)^{-1.00532}$.

Since the outer diameter D and wall thickness t of the steel pipe body 2 are not exactly constant along the entire steel pipe body 2, the outer diameter D may be represented by the average outer diameter and the wall thickness t may be represented by the average wall thickness. The average outer diameter is obtained by measuring, along each of two directions that are perpendicular to each other, the outer diameter of the steel pipe body 2 prior to make-up at a position 1 inch from the end surface of the box of the connection upon make-up, and averaging the measurements. Similarly, the average wall thickness is obtained by measuring, at each of 8 points arranged circumferentially (with a pitch of 45°), the wall thickness of the steel pipe body 2 prior to make-up at a position 1 inch from the end surface of the box of the connection upon make-up, and averaging the measurements.

Figure 4:
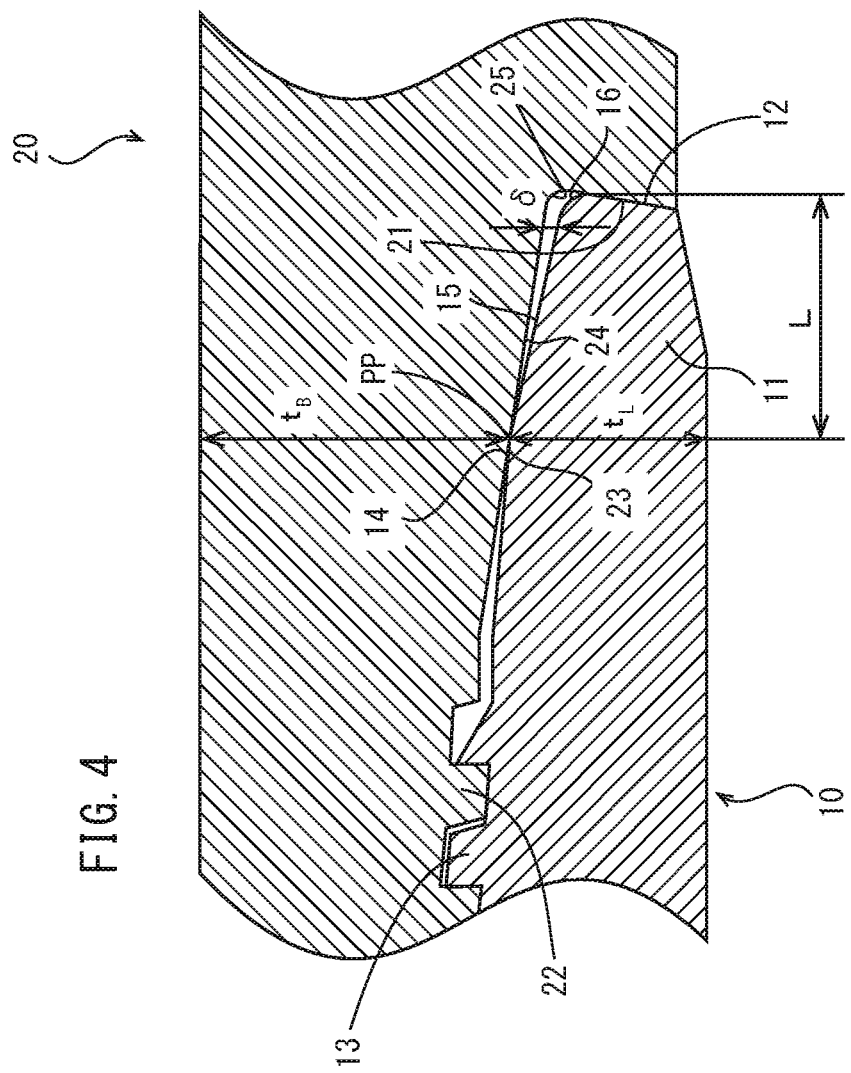
FIG. 4 is a longitudinal cross-sectional view of a threaded connection different from that of FIG. 3 taken along the pipe-axis direction, showing the nose and nearby portions.

In the nose 11 shown in FIG. 3, the pin taper surface 15 is substantially parallel to the box taper surface 24. That is, the distance between the pin taper surface 15 and box taper surface 24 is substantially constant. Alternatively, as shown in FIG. 4, the distance between the pin taper surface 15 and box taper surface 24 may gradually increase as it goes toward the tip of the nose 11. In such implementations, the area of contact between the pin sealing surface 14 and box sealing surface 23 upon make-up is larger than the area of contact shown in FIG. 3, and may essentially provide a surface contact (or line contact in a longitudinal cross section). Thus, the position of the pivot point PP as determined along the pipe-axis direction CL may vary depending on tightening force and on the amount of warping, i.e. deformation of the nose 11.

Although embodiments have been described, the present invention is not limited to the above embodiments and various modifications are possible without departing from the spirit of the invention.

EXAMPLES

To verify the effects of the above-described embodiments, a numerical simulation analysis was conducted by the elasto-plastic finite element method.

<Test Conditions>

For elasto-plastic finite element analysis, a threaded-connection model having the basic construction shown in FIG. 1 was used. The common test conditions were as follows.

Size of steel pipe: 14 inches, 100 # (with an outer diameter of 355.6 mm and a wall thickness of 17.78 mm)

Material: P110 steel (with a yield strength of 862 N/mm$^2$, an elastic modulus of 205 kN/mm$^2$, and a Poisson's ratio of 0.3) in accordance with the American Petroleum Institute (API) standards Type of threaded connection: coupling-type (with an outer diameter of 386 mm)

Shape and size of thread: trapezoidal buttress thread with a load-flank angle of −3°, a stabbing flank angle of 10°, a male-thread height of 1.978 mm, a thread pitch of 6.35 mm (4 TPI), and a thread tapering of 1/16

Size of nose: L=17 mm, $t_L$=10.3 mm

Make-up conditions: tightening until shouldering and further tightening with 1/100 turns Load conditions:

(1) internal pressure: pure internal-pressure load with 100% of the yield strength of the steel pipe body (2) external pressure: pure external-pressure load with 100% of the yield strength (100% in accordance with the API 5C3 standards) of the steel pipe body An internal pressure was applied to the inner peripheral surfaces of the pin and box, as well as the entire surfaces located inward of the contacts of the metal seal (e.g. the outer peripheral surface of the pin nose, the inner peripheral surface of the portion of the box corresponding to the pin nose, and the shoulder surfaces of the pin and box).

An external pressure was applied to the outer peripheral surfaces of the pin and box, as well as the entire surfaces located outward of the contacts of the metal seal (e.g. the thread surfaces of the pin and box).

<Evaluation Method>

As shown in Table 1 provided below, make-up was simulated for Models 1 to 6 under the above test conditions and was analyzed before calculating the internal-pressure and external-pressure sealabilities. Each of the internal-pressure and external-pressure sealabilities was obtained by dividing the seal contact force (or, more exactly, seal contact force per unit circumferential length) produced when an internal or external pressure under the above-described load conditions was applied by the seal contact force upon make-up (i.e. reduction ratio in seal contact force compared with the value upon make-up). Sealability is the ratio of the seal contact force produced when a pressure load is applied relative to the seal contact force upon make-up, and the larger the value, the better the sealability.

TABLE 1

| Model | Clearance δ [mm] | Wall-Thickness Ratio $t_B/t_L$ | Internal-Pressure Sealability | External-Pressure Sealability |
|---|---|---|---|---|
| 1 | 0.15 | 2.25 | 1.21 | 0.81 |
| 2 | 0.48 | 2.25 | 1.23 | 0.81 |
| 3 | 0.08 | 2.25 | 1.21 | 0.77 |
| 4 | 0.14 | 1.38 | 0.8 | 0.91 |
| 5 | 0.3 | 2.25 | 1.22 | 0.81 |
| 6 | 0.06 | 2.25 | 1.21 | 0.71 |

In the present tests, 0.43 mm>δ>0.13 mm. Thus, Models 1 and 5 are inventive examples, while Models 2 to 4 and 6 are comparative examples. Model 2 has a clearance δ equal to or larger than the upper limit (0.43 mm). Models 3 and 6 each have a clearance δ equal to or smaller than the lower limit (0.13 mm). Model 4 has a wall thickness ratio $t_B/t_L$ equal to or smaller than the lower limit (1.4).

Figure 5:
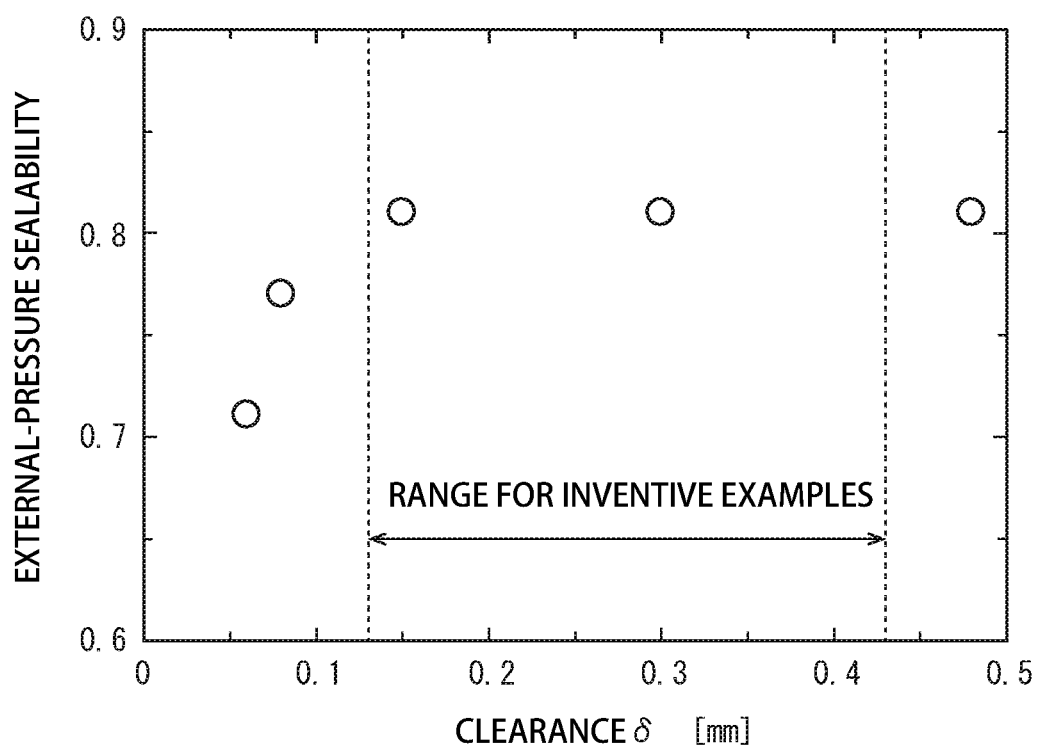
FIG. 5 is a graph showing the correlation between the clearance at the nose and the external-pressure sealability.

The external-pressure sealability values of the models other than Model 4 are shown in FIG. 5. As will be clear from this graph, the external-pressure sealability significantly changes depending on whether the clearance δ is above or below the lower limit. That is, when the clearance δ becomes below the lower limit, the external-pressure sealability significantly decreases. This is presumably because the nose 11 deforms, or warps, such that its tip abuts the inner periphery of the box 20.

For Model 4, which has a wall thickness ratio smaller than the lower limit, the internal-pressure sealability is very low. Model 2 has internal-pressure and external-pressure sealabilities substantially equal to those of Models 1 and 5; however, since a clearance δ that is equal to or larger than the upper limit means an increased amount of cut, the production cost of Model 4 is high.

The above results demonstrate that the threaded connections of the inventive examples have better internal-pressure sealabilities and better external-pressure sealabilities than the threaded connections of the comparative examples.

EXPLANATION OF CHARACTERS

1: threaded connection for steel pipe
2: steel pipe body
10: pin
11: nose
12: pin shoulder surface
13: male thread
14: pin sealing surface
15: pin taper surface
16: pin round surface
20: box
21: box shoulder surface
22: female thread
23: box sealing surface
24: box taper surface
25: box round surface

The invention claimed is:

1. A threaded connection for connecting steel pipe bodies each having an outer diameter equal to or larger than 7 inches and a wall thickness equal to or larger than 0.7 inches, the threaded connection comprising:
a tubular pin; and
a tubular box configured to be made up on the pin as the pin is inserted therein,
the pin including:
a nose provided on a tip portion of the pin and having an outer diameter smaller than an inner diameter of a portion of the box that faces the tip portion of the pin when the connection has been made up;
a pin shoulder surface provided on a tip of the nose;
a pin taper surface provided on an outer periphery of the nose;
a pin round surface provided on an edge between the pin shoulder surface and the pin taper surface;
a male thread provided on an outer periphery of the pin; and
a pin sealing surface provided on the outer periphery of the pin and located between the nose and the male thread,
the box including:
a box shoulder surface facing the pin shoulder surface and configured to be in contact with the pin shoulder surface when the connection has been made up;
a female thread corresponding to the male thread and provided on an inner periphery of the box; and
the box sealing surface facing the pin sealing surface and configured to be in contact with the pin sealing surface upon make-up,
wherein Expression (1) provided below is satisfied and $t_B/t_L > 1.4$, $$0.30 + \min(a_n t_L + b_n D, n=1,2,3) > \delta > \min(a_n t_L + b_n D, n=1,2,3) \quad (1),$$

where δ [mm] is the clearance between the outer surface of the pin and the inner surface of the box upon make-up as measured at the borderline between the pin taper surface and the pin round surface, D [mm] is the outer diameter of the steel pipe body, t [mm] is the wall thickness of the steel pipe body, L [mm] is the distance between a pivot point, which is a position, in the region of contact between the pin sealing surface and the box sealing surface, which is closest to the tip of the pin, and the tip of the pin upon make-up as measured along the pipe-axis direction, $t_L$ [mm] is the wall thickness of the pin as measured at the pivot point, and $t_B$ [mm] is the wall thickness of the box as measured at the pivot point,
wherein min is a function that takes the minimum of the three factors in its parentheses,
$a1=(L/t) \times 0.0115 \times (t_L/t)^{-1.68778} - 0.00247 \times (t_L/t)^{-2.02052}$;
$b1=(L/t) \times 0.0076 \times (t_L/t)^{-0.65672} - 0.00120 \times (t_L/t)^{-1.06817}$;
$a2=(L/t) \times 0.00725 \times (t_L/t)^{-1.67341} - 0.00157 \times (t_L/t)^{-1.93212}$;
$b2=0$;
$a3=-(L/t) \times 0.00256 \times (t_L/t)^{-2.40620} + 0.00372 \times (t_L/t)^{-2.19899}$; and
$b3=(L/t) \times 0.01986 \times (t_L/t)^{-0.88615} - 0.01048 \times (t_L/t)^{-1.00532}$.

2. The threaded connection according to claim 1, wherein $t_B/t_L > 2.0$.

3. The threaded connection according to claim 2, wherein the threaded connection is a coupling-type connection.

4. The threaded connection according to claim 1, wherein the nose has a 0.2% offset yield strength 1.05 or more times a 0.2% offset yield strength of the steel pipe body, prior to make-up and as measured in a circumferential direction.

5. The threaded connection according to claim 1, wherein at least one of chemical conversion treatment, sand blasting and metal plating is applied to at least one of the male thread and the female thread, at least one of the pin sealing surface and the box sealing surface, and at least one of the pin shoulder surface and the box shoulder surface.

* * * * *